March 17, 1970 G. M. BENSON 3,500,799
ELECTROMECHANICAL CONTROL SYSTEM
Filed Sept. 27, 1967 8 Sheets-Sheet 1
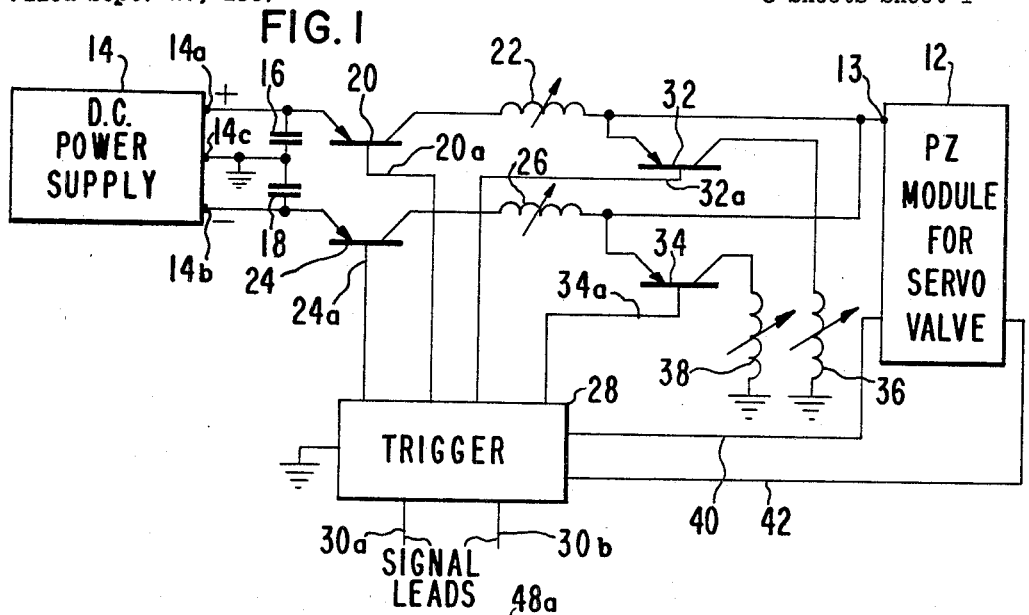
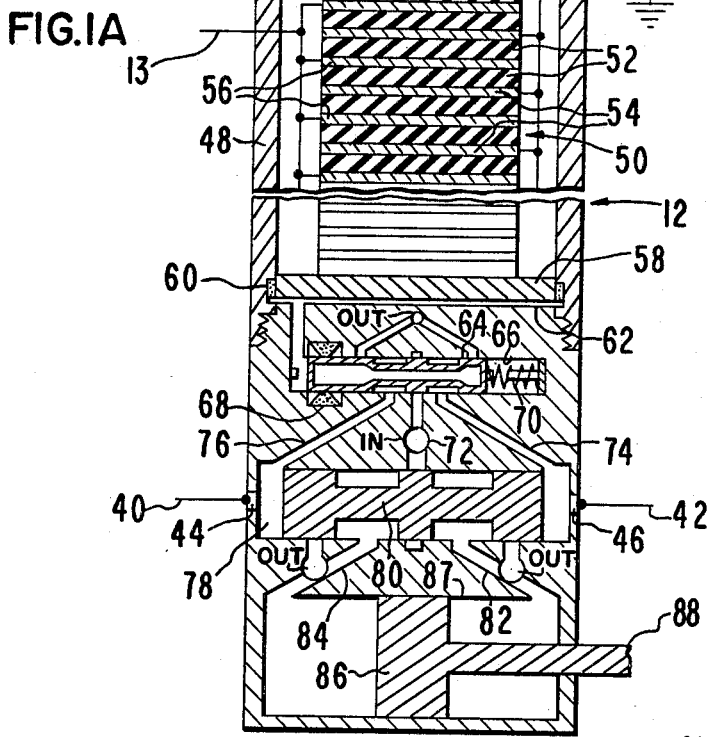
INVENTOR.
GLENDON M. BENSON
BY
Townsend and Townsend
ATTORNEYS INVENTOR.
GLENDON M. BENSON
BY Townsend and Townsend
ATTORNEYS March 17, 1970   G. M. BENSON   3,500,799
ELECTROMECHANICAL CONTROL SYSTEM
Filed Sept. 27, 1967   8 Sheets-Sheet 3

INVENTOR.
GLENDON M. BENSON
BY Townsend and Townsend
ATTORNEYS

March 17, 1970   G. M. BENSON   3,500,799
ELECTROMECHANICAL CONTROL SYSTEM
Filed Sept. 27, 1967   8 Sheets-Sheet 4

INVENTOR.
GLENDON M. BENSON
BY Townsend and Townsend
ATTORNEYS

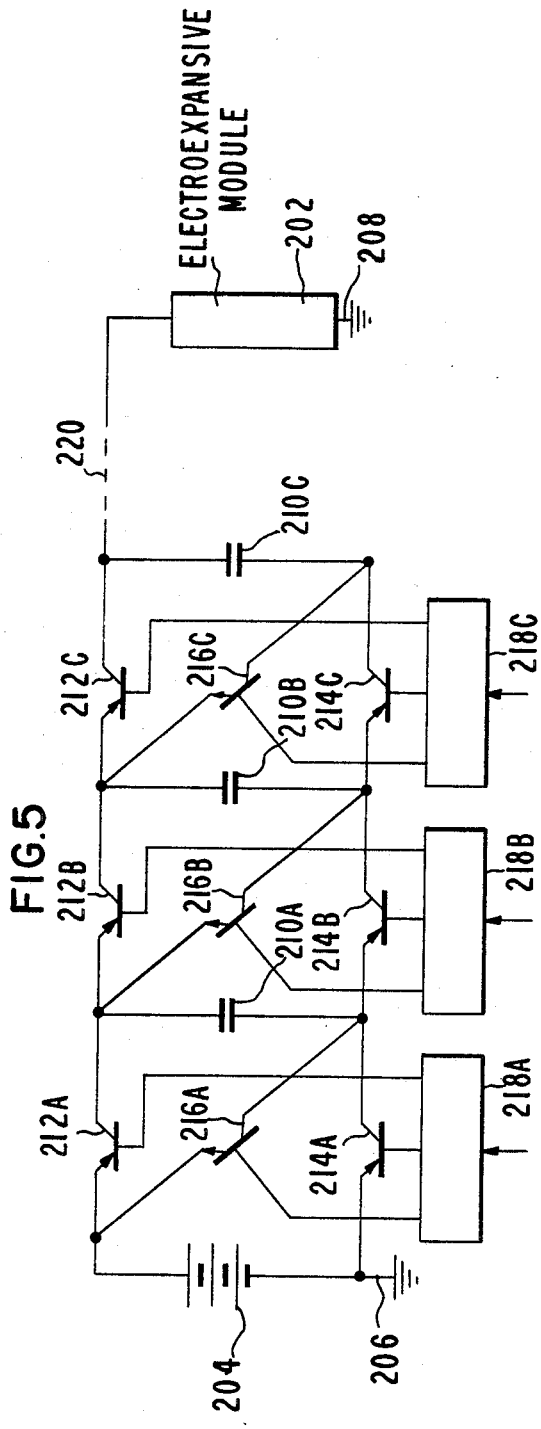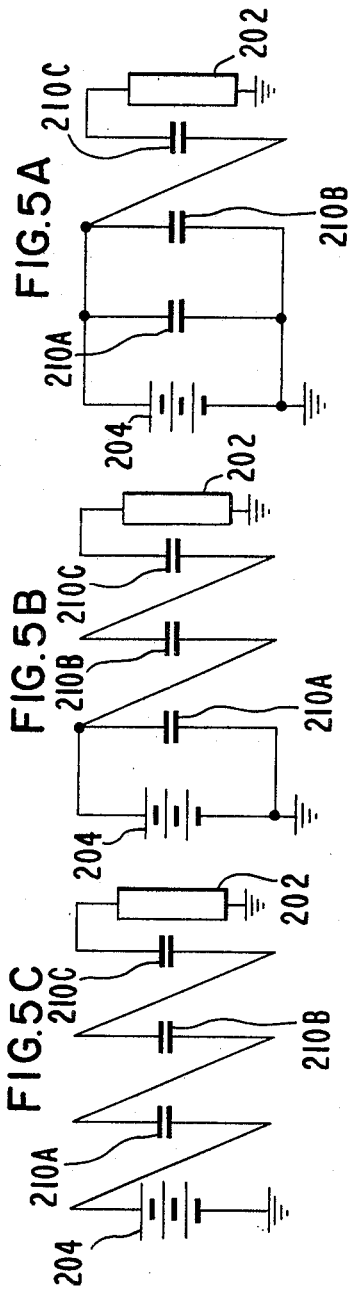

INVENTOR.
GLENDON M. BENSON
BY
Townsend and Townsend
ATTORNEYS

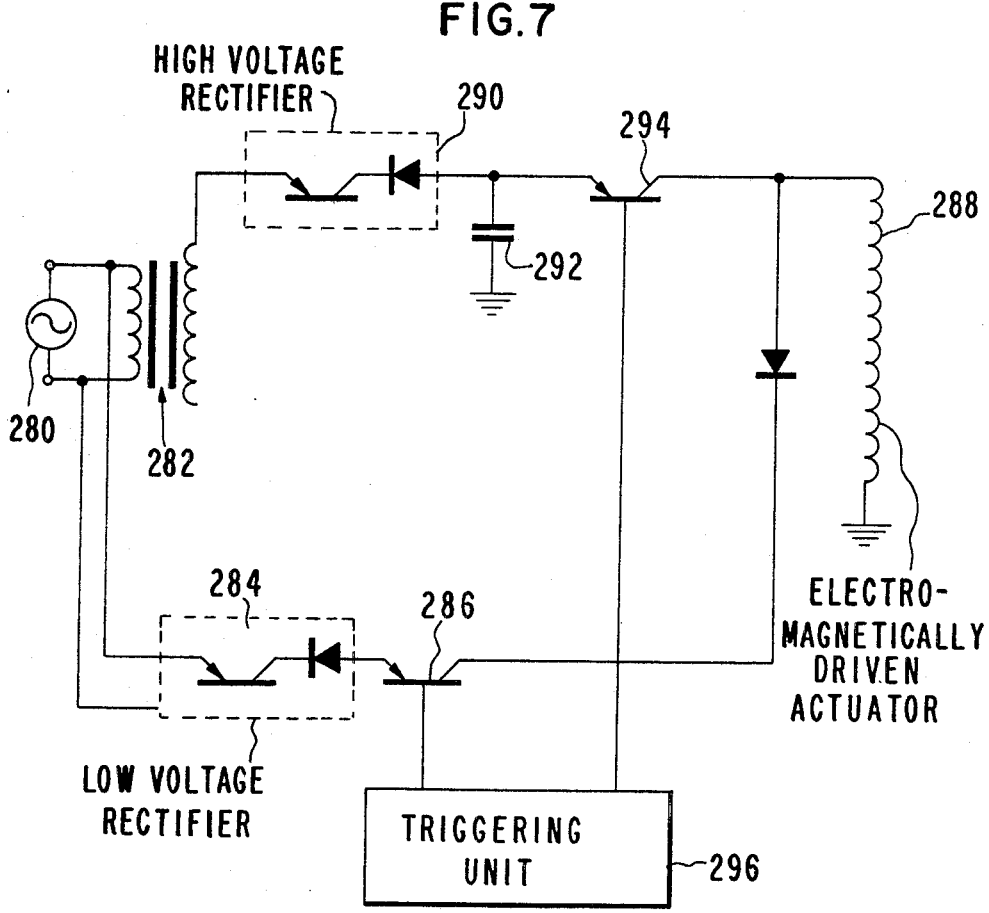

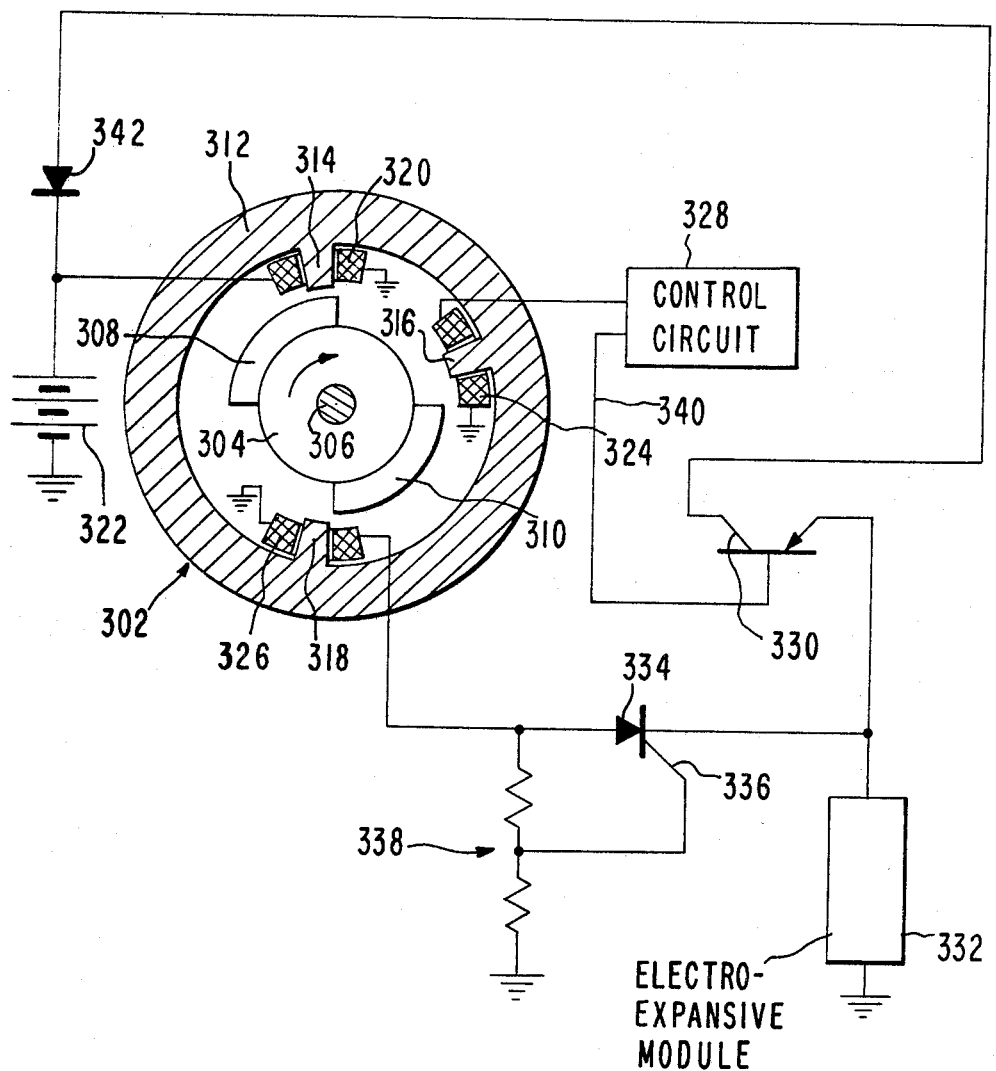

United States Patent Office 3,500,799
Patented Mar. 17, 1970

3,500,799
ELECTROMECHANICAL CONTROL SYSTEM
Glendon M. Benson, Danville, Calif., assignor, by mesne assignments, to Physics International Company, San Leandro, Calif., a corporation of California
Filed Sept. 27, 1967, Ser. No. 671,060
Int. Cl. F02b *3/06;* F02m *51/00;* F04b *19/00*
U.S. Cl. 123—32
10 Claims

ABSTRACT OF THE DISCLOSURE

An electromechanical control system for controlling the timing, duration of excitation, and function of a transducer. A control system for controllably actuating two or more electromechanical transducers in precise timed relationship to one another. A control system for controlling the injection of fuel into the cylinders in a multi-cylinder engine.

---

This invention relates to a system for actuating and deactuating electromechanical transducers with great precision and speed. The invention is particularly suitable for employment with electroexpansive transducers, which transducers have extremely fast response times.

Improved electromechanical transducers have permitted improvement and simplification of many machine functions and processes, such as fuel injection into internal combustion engines. Such transducers employ electroexpansive, e.g., piezoelectric or ferroelectric elements that have very fast response times. Full utilization of the improved transducers and exploitation of their fast response characteristics require a control system that is accurate, versatile, rugged, and simple. The principal object of the present invention is to provide a control system having the above enumerated advantageous characteristics.

The present invention is particularly suited for controlling fuel injection systems that include electroexpansive transducers for pumping and/or valving the fuel. Because the invention affords an electric control system useful with such transducers, the fuel injection can be controlled very precisely and accurately in proportion to engine speed, engine operating temperature, engine torque output and like variables.

Electrical control of injection timing permits employment of solid state devices in controlling engine timing and speed, which devices are less subject to wear than mechanical devices heretofore employed. Consequently, the present invention affords a system having a much longer trouble-free life than is possible with prior art devices for the same purpose.

Other objects, features and advantages of the invention will be more apparent after referring to the following specification and accompanying drawings in which:

FIG. 1 is a schematic diagram of a control system according to the present invention;

FIG. 1A is a partially schematic elevation in cross section of an electromechanical actuator control of which the present invention is peculiarly suited to effect;

FIG. 5 is a schematic diagram of a control system affording digital actuation of a transducer;

FIGS. 5A, 5B and 5C are equivalent circuit diagrams showing the circuit of FIGURE 5 at different stages of operation;

FIG. 7 is a schematic diagram of a control system for high speed actuation of an electromagnetic actuator; and FIG. 8 is a schematic diagram of a control system that functions similar to the system of FIG. 4 and includes certain modifications.

Figure 2:
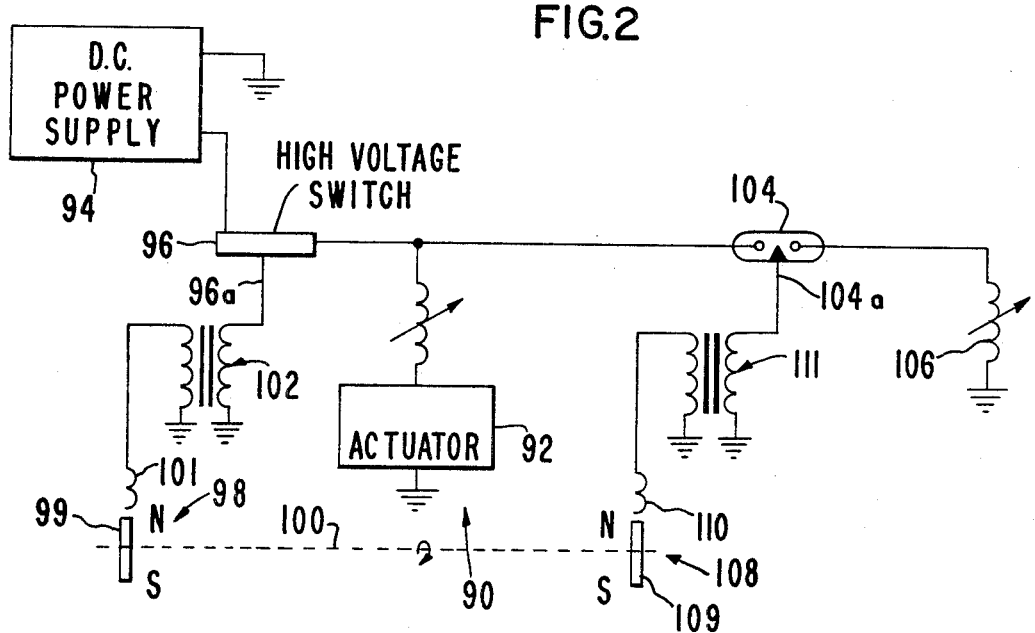
FIG. 2 is a schematic diagram of another form of control system according to this invention.

Referring more particularly to the drawings and specifically to FIG. 1, a control system according to the present invention is shown in connection with an electroexpansive piezoelectric, such as transducer or actuator 12. The actuator has an electrical input terminal 13 to afford connection thereto of the control system of the present invention. The control system includes a DC power supply 14 for producing a voltage in the kilovolt range. The power supply has a positive output terminal 14a and a negative output terminal 14b, as well as a common terminal 14c. Across output terminals 14a and 14c is connected a first capacitor 16, and across output terminals 14b and 14c is connected a second capacitor 18. The capacitors are charged by power supply 14, capacitor 16 being charged positively with respect to ground and capacitor 18 being charged negatively with respect to ground. For controllably connecting capacitor 16 to actuator 12 a switch 20 is provided between the capacitor and the actuator. A variable impedance 22 is connected in series with the switch so as to afford adjustment of the rise time of the signal switched through switch 20 to the actuator. A similar circuit is associated with capacitor 18, a switch 24 and a variable impedance 26 being connected in series between capacitor 18 and the actuator. The presence of variable impedances 22 and 26 permits variability of the charge rate of the module and thus permits control of the operating characteristics of the module.

Switches 20 and 24 are provided with respective control terminals 20a and 24a which are connected to a trigger control circuit 28. Trigger control circuit 28 is a conventional circuit which includes input leads 30a and 30b, and suitable bias supplies that convert input signals on the input terminals to voltage and/or current pulses of appropriate magnitude and polarity to effect operation of switches 20 and 24. Trigger circuit 28, in addition, includes a pulse generating subsystem to control a discharge switch 32 associated with switch 20 and discharge switch 34 associated with switch 24. Discharge switches 32 and 34 are adapted to discharge the energy that is capacitively stored in the actuator. Switch 32 is connected through a variable impedance 36 to ground and switch 34 is connected to ground through a variable impedance 38. Independent variability of impedances 36 and 38 provides two distinct time patterns for controlling the time and rate of discharge of the module. Switches 32 and 34 are provided with respective control terminals 32a and 34a which are connected to trigger circuit 28. Trigger circuit 28 is adapted to apply a signal to switch terminals 32a and/or 34a in response to recitation of the trigger circuit by feedback conductors 40 and 42.

As can be seen from FIG. 1A, conductors 40 and 42 are connected to position sensors 44 and 46, respectively, which are provided in actuator 12. Sensors 44 and 46 can be any suitable devices such as capacitive, inductive, or Hall effect pickups.

As can be seen from FIG. 1A, actuator 12 includes an outer housing 48 in which is provided an electroexpansive module 50 that includes a solid or liquid body of material that exhibits mechanical strain in response to application of an electric field thereto. An exemplary structure for module 50 includes a body that is formed of a stack of individual discs 52, which discs are made of a material that produces a strain when subjected to an electric field. In between each individual disc is a conductive electrode, a first group of alternate electrodes 54 being connected to housing 48 which is grounded, and a second group of electrodes 56 being connected to input terminal 13. To provide improved reliability to the actuator, additional and redundant groups of electrodes and discs can be provided in the stack. The discs are in series mechanically and in parallel electrically so that a voltage applied to input terminal 13 will effect axial strain on the stack; whether such strain causes elongation or shortening of the stack depends on the polarity of the signal applied to the input terminal 13. If there are redundant electrodes plural parallel circuits are formed.

One end of module 50 is rigidly secured to an end plate 48a in casing 48. The other end of the stack has secured thereto a piston 58. The piston is supported in housing 48 by an elastomer seal 60 or metal bellows seal which seal affords a degree of movement of the piston in response to axial expansion and contraction of electroexpansive stack 50. Seal 60 also prevents leakage past piston 58, thereby to define a fluid tight chamber 62. Chamber 62 is filled with any suitable noncompressible fluid and communicates with a valve body 64 slidably mounted in a valve bore 66. The end of valve body 64 adjacent chamber 62 is provided with an elastomer seal 68 or metal bellows which affords movement of the valve body within bore 66 and prevents leakage of fluid in chamber 62 into the bore 66. The valve body is arranged so that when stack 50 is in an electrically discharged state the valve is centrally located as shown in FIG. 1A. A compression spring 70 is provided to assure such condition. Valve body 64 is reciprocally movable in bore 66 rightwardly and leftwardly from the central neutral position. Communicating with bore 66 is an inlet opening 72 for admitting pressurized fluid from a source, not shown. Also communicating with bore 66 is a fluid outlet passage 74. When valve body 64 is moved leftwardly, passage 74 is supplied with pressurized fluid from inlet 72. Valve bore 66 also has an outlet passage 76 which communicates with inlet 72 when valve body 64 is moved rightwardly. Fluid pasages 74 and 76 communicate with opposite ends of a secondary bore or chamber 78 in which is slidably mounted a secondary valve body 80. Valve body 80 is similar to valve body 64 but is usually larger in size. Valve body 80 is adapted to connect fluid inlet opening 72 to one or the other of secondary outlet passages 82 or 84. Such passages communicate to opposite sides of an actuator piston 86 which is in a cylinder chamber 87 and has a rod 88 extending exterior of casing 48. Any load desired can be operatively connected to rod 88. Valve chambers 66 and 78 have fluid return openings 89 associated therewith to return fluid to the pressure source as the respective valves move in the chambers.

The operation of this embodiment of my invention is as follows: when electroexpansive module 50 is de-energized or neutral, valve bodies 64 and 80 reside in the position shown in FIG. 1A. Assume now that an input signal is fed to lead 30a of trigger circuit 28 and that such signal is converted to a biasing potential connected to terminal 20a of switch 20 so that the switch is closed. The voltage to which capacitor 16 is charged is thereby applied to input terminal 13 of actuator 12 and to electroexpansive module 50 contained therein. The module is strained so as to move piston 58 downwardly as viewed in the figure. Such movement causes valve body 64 to move rightwardly against spring 70. Fluid inlet 72 is thereby communicated to fluid passage 76, as a consequence of which secondary valve body 80 moves rightwardly. Valve bodies 64 and 80 are pressure balanced so that movement thereof requires only minimal force. Such rightward movement continues until sensor 46 detects the arrival of valve body 80 at its rightwardmost position. The sensor delivers a signal to trigger circuit 28 through conductor 42 which operates discharge switch 32 by application of a suitable signal to terminal 32a. Discharge of module 50 returns to the neutral position shown in FIG. 1A the module, piston 58, and plunger 64. The rate of discharge is determined by the magnitude of impedance 36. Rightward positioning of valve body 80 connects pressurized fluid from inlet 72 to passage 84 which drives piston 86 rightwardly in cylinder chamber 87 and effects corresponding movement of rod 88 and the load attached to the rod. Such movement of piston 86 continues either until the piston reaches the end of its travel or until electroexpansive module 50 is actuated by an opposite polarity voltage from capacitor 18 and switch 24. Such action moves piston 58 upwardly which in turn moves valve body 64 leftwardly. Thus, pressurized fluid is supplied through passage 74 to move secondary valve body 80 back toward the center or neutral position.

In order to move actuator rod 88 and the load attached thereto toward the left the following sequence of events occurs: switch 24 is closed by application of a suitable control signal to trigger input lead 30b which in turn causes application of a bias signal to terminal 24a of the switch. Closure of switch 24 charges module 50 in actuator 12 to a negative voltage equal to the negative charge on capacitor 18 so that piston 58 is moved upwardly. This permits spring 70 to force primary valve body 64 leftwardly. As a consequence of leftward movement, pressurized fluid is applied from inlet opening 72 through fluid transfer passage 74 into the right side of secondary valve body 80. The latter valve body is accordingly moved leftwardly thereby to apply pressurized fluid from inlet opening 72 through transfer passage 82 to the right side of actuator piston 86. When secondary valve body 80 reaches its leftward extreme, sensor 44 causes application of a signal to trigger circuit 28 through conductor 40. Trigger circuit 28 applies a signal to terminal 34a in response to such signal on conductor 40 so as to discharge module 50 through variable impedance 38. Such discharge of module 50 moves piston 58 downwardly to a neutral position. The force of downward movement is transmitted by the fluid contained in chamber 62 to move valve body 64 rightwardly against the force of spring 70 to the central neutral position of bore 66. Thus, fluid flow through passage 74 is terminated and the force on valve body 80 is terminated. Consequently, the rate of movement of piston 86 remains constant until module 50 is strained in the opposite direction, by closure of switch 20.

A different form of control system embodying the present invention is shown in FIG. 2 at 90 wherein reference numeral 92 indicates an electromechanical actuator that includes as the active element thereof an electroexpansive module having the characteristics mentioned hereinabove in reference to FIG. 1A. Transducers with which the circuit of FIG. 2 is particularly suited include those having active elements of piezoelectric material, for example, see U.S. Patent 3,194,162 and U.S. Patent application Ser. No. 484,404, filed Sept. 1, 1965. For understanding the form of the invention shown in FIG. 2, it is convenient to assume that actuator 92 is drivably connected to an injection valve associated with a fuel injector in an internal combustion engine. The actuator is connected to a high voltage DC power supply 94 through a high voltage switch 96. Power supply 94 is a conventional device having an output voltage in the kilovolt range, and switch 96 can be embodied in a spark gap device, a silicon controlled rectifier, or the like. One type of power supply furnishes a variable voltage to a capacitor which in turn is connected to the output leads of power supply 94. The system is arranged such that closure of switch 96 connects the DC power supply to actuator 92 and produces a strain in the electroexpansive material in the actuator which is mechanically linked to perform useful work.

For triggering or closing switch 96, a timed pulse is fed to the control terminal 96a of the switch from a timing device 98, such as an optical sensor or a variable reluctance pickup. In the drawing, timing device 98 is exemplified by a variable reluctance pickup having an arm 99 that is attached to and rotatably driven by a shaft 100. The pickup includes a detecting element 101 at which is generated a pulse in response to each rotation of arm 99. In the case where actuator 92 is a fuel injection device for an internal combustion engine, shaft 100 is driven at a rate proportional to crankshaft speed. A step-up transformer 102 is provided for generating a signal sufficiently large to close switch 96. Thus, each time a signal is generated in the pickup coil of timing device 98, power supply 94 is connected to actuator 92 and the actuator is stressed.

Electroexpansive actuators and, particularly, piezoelectric actuators constitute a capacitive load so that once the capacitance is charged the actuator will remain in a stressed condition until discharged. To provide for a controlled discharge of the actuator, a second high voltage switch 104 is connected to the actuator 92 for establishing a path to ground, as at 106. Switch 104 includes a control terminal 104a which, when excited, closes the switch and establishes a path between the actuator and ground 106 so as to discharge the actuator and remove the strain therefrom. It will be noted in FIG. 2 that in the charge and discharge paths for actuator 92 are variable impedances; these impedances permit variation of time rate of actuation and deactuation of actuator 92.

Associated with shaft 100 is a second variable reluctance pickup 108 which has an arm 109 carried on shaft 100. An electric pickup 110 is mounted adjacent arm 109 for generating electric pulses in response to rotation of shaft 100; in series with pickup 110 is a set-up transformer 111 which applies to control terminal 104a a signal for closing switch 104. Arm 109 is mounted on shaft 100 and is positioned relative to pickup 98 such that the period between the straining and relaxing signals to actuator 92 is established at the desired magnitude. In internal combustion engines, shaft 100 is driven on a speed proportional to crankshaft speed so that fuel injection valved by actuator 92 occurs at the correct time and for the correct duration. The positions of detecting elements 101 and 110 are independently adjustable so as to permit precise arjustment of the time of actuation and deactuation of actuator 92 with respect to the rotative position of shaft 100.

Thus, the control system of FIG. 2 is extremely simple, fast acting, precise and adjustable over a sufficient range to accommodate any desired set of operating characteristics.

Figure 3:
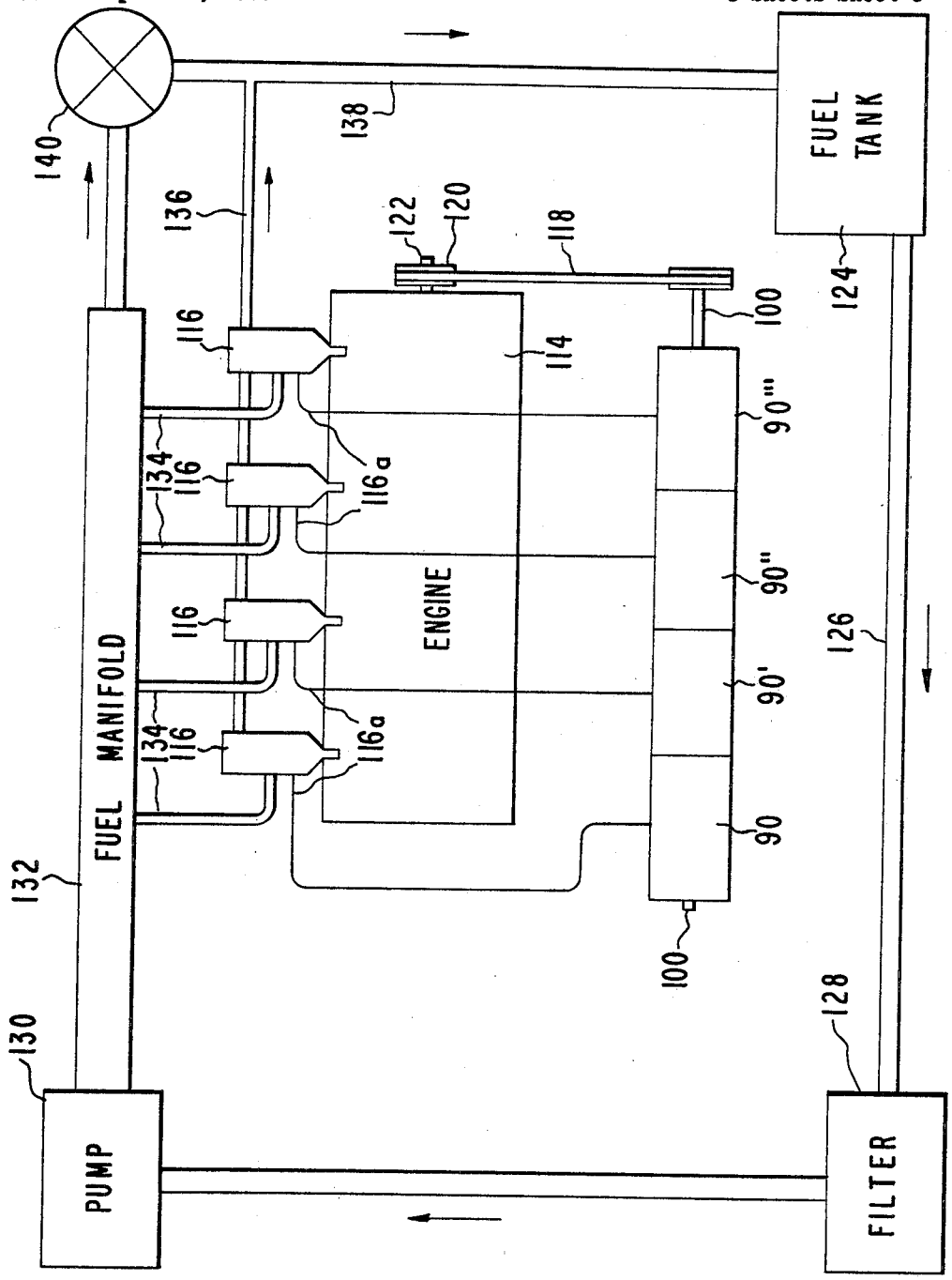
FIG. 3 is a schematic diagram of plural control systems of the type shown in FIG. 2 which are shown for controlling fuel injection into an internal combustion engine.

A control system of the type shown in FIG. 2 can be readily accommodated to a multi-cylinder internal combustion engine such as is shown in FIG. 3 at 114. The specific engine shown in the figure has four cylinders, each of which is provided with an electroexpansively driven injection device 116 of the type exemplified in the above-mentioned co-pending patent application filed concurrently herewith. In the context of the control system of FIG. 3 fuel injection device 116 can also be embodied by a piezoelectric injection pump of the type shown in U.S. Patent 3,194,162 or in co-pending U.S. Patent Application Ser. No. 484,404, filed Sept. 1, 1965. Each such injection device has an input terminal 116a which when electrically energized activates an electroexpansive module interior thereof, so as to cause the module to drive either a fuel valve as described in the co-pending concurrently filed patent application or an injector pump piston such as described in U.S. Patent 3,194,162 or in co-pending U.S. Patent application Ser. No. 484,404 filed Sept. 1, 1965. A circuit 90 of the type described above in connection with FIG. 2 and used to actuate fuel injector valves is provided in association with each valve for controlling the opening and closing of each valve in accordance with the demands of the engine. Signals proportional to the demands of the engine are applied to the control circuits by drivably connecting shaft 100 through a timing chain or the like, indicated schematically at 118, to a timing sprocket or the like 120 driven by engine shaft 122. Control systems 90, 90', 90" and 90''' are associated with respective injection valves 116 and include arms designated 99 and 109 in FIG. 2. That are rotatably driven by shaft 100. The rotative position of the arms on shaft 100 is adjustable so that the timing of fuel injection into the engine cylinders is precisely adjustable. Therefore, efficient engine operation can be achieved. The system of FIG. 3 includes other conventional elements used with the system, such as a fuel tank 124 which has an outlet line 126 in which is provided a fuel filter system 128. A pump 130 draws the filtered fuel thereto and discharges it into a high pressure manifold 132. Manifold 132 has a number of outlet fittings 134 which communicate fuel to the various injector valves 116. The valves have bleed openings which are commonly connected to a bleed line 136 which in turn is connected to the main fuel return line 138. Manifold 132 includes a purge valve 140 which has an outlet end in communication with return line 138.

In operating engine 114, pump 130 maintains the fuel pressure in manifold 132 at a desired pressure, which pressure exists at the valves of piezoelectric actuators 116. Shaft 100 is rotated in response to rotation of engine shaft 122. The individual piezoelectric actuators are sequentially charged and discharged so as to deliver fuel to the cylinders of the engine in appropriate quantities and at appropriate times. Because each individual circuit 90, 90', 90" and 90''' includes arms 99 and 109 for respectively opening and closing valves 116, the opening and closing of the valves can be readily adjusted and precisely controlled by appropriately positioning the arms on shaft 100, or rotating pickups 101 and 110 relative one another. Thus, efficient engine control is maintained at all times. Because the control system is compatible with other conventional mechanisms such as centrifugal advance devices, vacuum advance devices, and the like, incorporation into existing engines is feasible.

The control system of the type shown in FIG. 2 can be used on an engine as shown in FIG. 3 at 114 wherein the injection device 116 is a piezoelectric pump of the type shown in U.S. Patent 3,194,162 or in co-pending U.S. Patent application Ser. No. 484,404, filed Sept. 1, 1965. In this configuration the fuel manifold supplies pressurized fuel to the injector pumps which in turn inject fuel in response to the voltage generated by control systems 90, 90', 90" and 90'''.

Figure 3A:
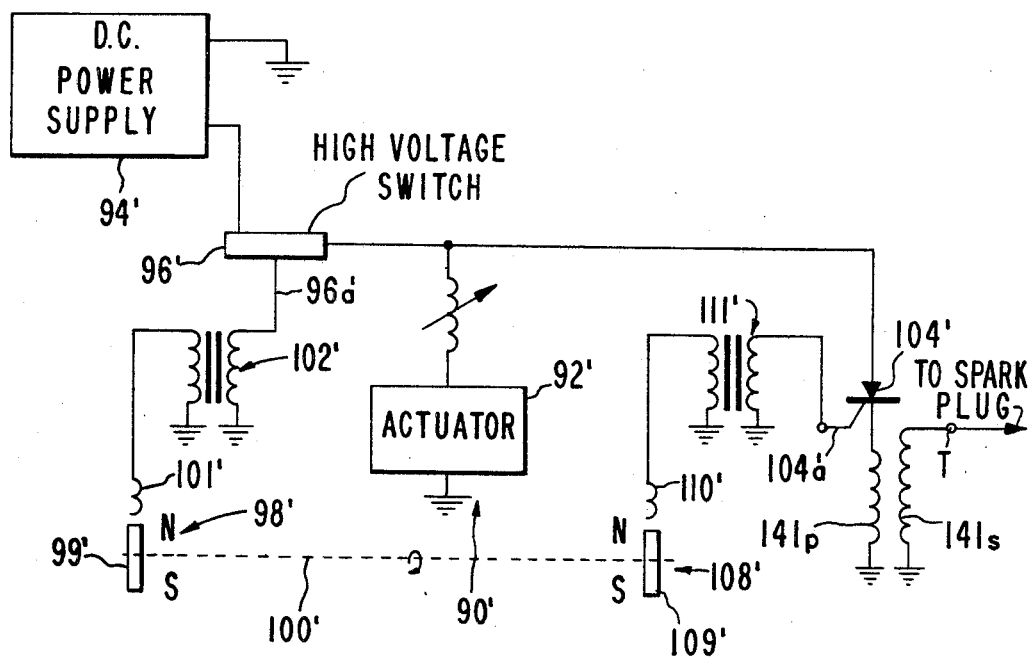
FIG. 3A is a modification of the circuit of FIG. 2 which is particularly for controlling a spark ignition internal combustion engine.

FIG. 3A indicates a modification of a control system of the present invention that is particularly suitable for employment on spark ignition engines. Because the modification is virtually identical to the circuit shown in FIG. 2, with an exception to be explained more fully hereinbelow, identical reference numerals to which a prime has been added are used to identify the elements in FIG. 2. In the figure, a silicon control rectifier 104' is provided to define the discharge control for actuator 92'. The silicon control rectifier has a control terminal 104a that is connected through transformer 111' to signal pickup device 108'. In series with the discharge path is a primary transformer winding 141p, the transformer also having a secondary winding 141s. Secondary winding has an output terminal T which is connected to the spark plug of the same cylinder with which actuator 92' is associated for controlling fuel injection. It will be apparent that in operation of an internal combustion engine employing the control circuit of FIG. 3A that pickup 98' will switch an appropriately timed charging signal to the electroexpansive material in actuator 92' so that the fuel injection valve controlled by the actuator will be opened, or the injector pump will inject fuel. After a suitable interval, as determined by the time relation between pickup 108 and pickup 98, the signal will be applied to SCR 104' so as to discharge the actuator module through primary winding 141p. Such action has two consequences: (1) the fuel injection is terminated by the closure of the valve or the stoppage of the pump piston coupled to the electroexpansive module of the actuator or pump 92', and (2) transformer seecondary 141s is excited by flux lines from the primary so that a spark plug triggering signal is generated at output terminal T. Thus, it is seen that the control system of the present invention is readily adaptable for controlling of fuel injection timing and spark ignition timing.

Figure 4:
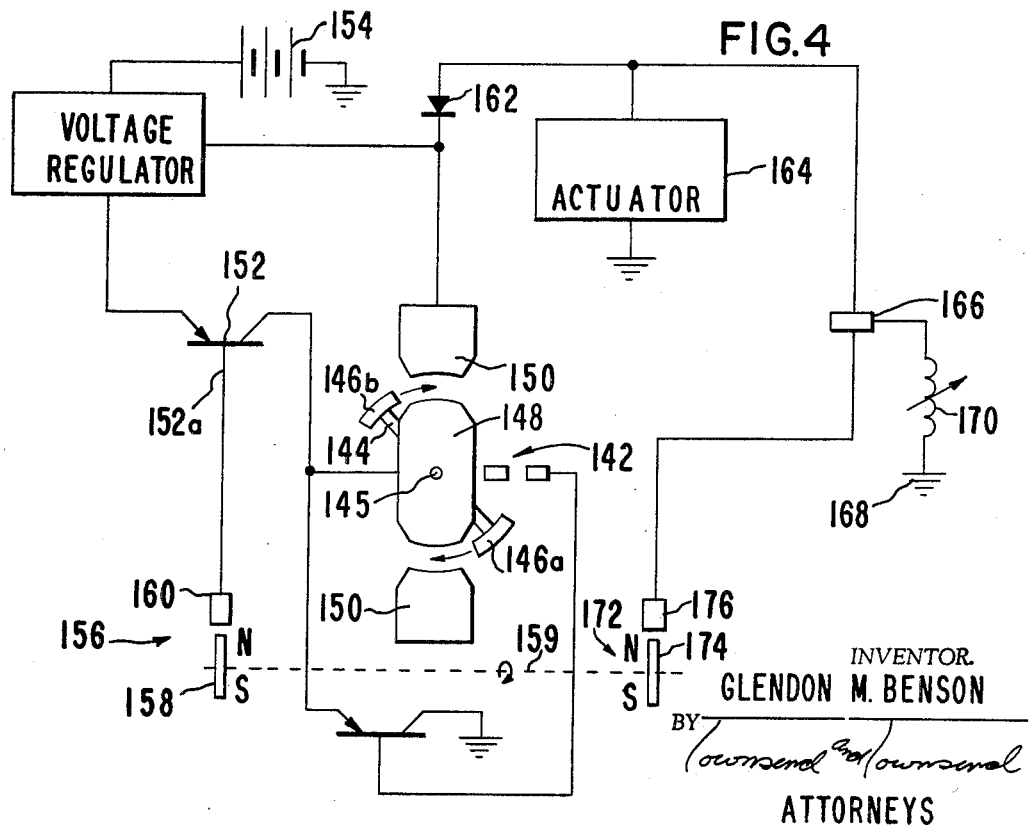
FIG. 4 is a schematic diagram of still another control sysetm according to the present invention.

Still another form of control system embodying the present invention is shown in FIG. 4. Such system, which is particularly suitable for diesel engine service, includes an alternator 142 that has a rotor 144 that is driven proportional to the speed of the crankshaft of the engine (not shown). Rotatably driven by rotor 144 are poles or conductor bars 146a and 146b which cut flux lines formed between a field coil 148 and opposed stator pole pieces 150. The alternator, having stationary, low induction field coils 148 and stationary stator coils 150, requires no commutators or slip rings, and results in a rugged, dependable unit offering a high degree of field control. The alternator produces a voltage rise by virtue of rotor conductors 146a and 146b cutting flux lines between the stationary field poles as well as by virtue of the increase in flux lines due to the increasing field current when the field is switched to an "on" condition. For so switching the field a switch 152, here exemplified by a transistor, is adapted to controllably connect a battery 154 across field 148 of the alternator. Switch 152 has a control terminal 152a to which is applied for closing the switch a pulse from a timing pickup 156 herein shown as a variable reluctance pickup. The pickup has a rotor arm 158 which is driven by a shaft 159 adjacent a pickup coil 160 and develops an output signal from the pickup coil each time the rotor passes the pickup coil. Thus, when rotor 158 passes pickup coil 160 switch 152 is closed and field coil 148 is energized. Thus, when conductor rod 146b of rotor 144 of the alternator cuts the flux lines between stator pole 150 and energized field coil 148, a pulse is produced at the stator which is connected through a diode 162 to an electroexpansive actuator 164, a device constructed and arranged to open a fuel valve (not shown) in a cylinder of diesel engine or to drive a fuel injector pump of the type shown in U.S. Patent 3,194,162 or co-pending application Ser. No. 484,404.

As in the embodiment described hereinabove in connection with FIG. 2, the present embodiment has a discharge switch 166 which is adapted to complete a circuit to ground 168 through a variable impedance 170 in order to discharge the actuator and interrupt injection of fuel at the appropriate time. For properly timing switch 166, a second timing pickup 172, herein shown as a variable reluctance pickup is provided. The pickup includes a rotating arm 174 attached to shaft 159. A pickup coil 176, across which is generated a signal each time the arm passes the pickup, is provided adjacent the arm. As stated hereinabove, the rotative position of arm 174 with respect to the rotative position of arm 158 (and/or the relative position of pickup coils 160 and 176) is established so as to provide the appropriate duration of energization of the electroexpansively actuated fuel pump or valve 164.

The control systems described hereinabove afford superior efficiency of operation in internal combustion engines. The control system of this invention is applicable both to spark ignition engines as well as diesel engines.

In a throttled spark ignition engine the operation is predominately at part throttle conditions. For passenger car engines, over 95% of the engine hours occur at a power level that can be obtained with the throttle acting as a critical flow orifice. As a result, the air flow (pounds of air/sec.) to the engine remains apprximately independent of engine r.p.m. for a particular butterfly valve angle. Therefore, the air mass used per cycle varies approximately inversely with speed for a constant butterfly angle. This implies that the fuel mass or volume injected per cycle will vary approximately inversely with speed for a constant throttle setting, provided the fuel-air ratio remains independent of speed for that setting. Because of air dilution with exhaust gases, the mass of air per cycle decreases more rapidly than parabolically with speed. This dilution requires a richer fuel mixture as air density decreases and dilution increases with increasing r.p.m. at constant throttle.

For engine operations during which time the throttle acts as a non-critical flow orifice, the quantity of fuel required per injection increases less than parabolically as the engine speed decreases for a constant throttle setting and is a function of r.p.m. only. The quantity of fuel can be explicity stated in terms of engine r.p.m. and throttle setting for an engine having a constant volumetric efficiency at wide open throttle. Particular engine designs cause a second order perturbation to these relations for which compensation can be easily made.

As a result of the above relations for critical-flow and non-critical-flow throttling, the control of the injection system for spark ignition engine can now be specified for the injection systems that use piezoelectrically actuated valves.

Consider this injection system to be supplied by a constant fuel pressure. Then the quantity of fuel injected per injection is proportional to the time duration of injection or inversely proportional to engine r.p.m. for a constant crank angle duration. It was shown above, however, that the fuel quantity required per cycle is inversely proportional to engine r.p.m. for a constant throttle setting. As a result, the fuel requirements can be met by having the injection duration occupy a constant number of crank angles (or cam angles) for each throttle setting independent of engine r.p.m. over the complete engine operating range in which the throttle acts as a critical flow orifice. Since the injection duration in crank angles is specified by the angular position of pickup 172 relative to pickup 156, the control is met, assuming that pickup 156 is fixed, by simply linking mechanically the butterfly valve to the non-rotating housing of pickup 172 and maintaining constant fuel feed pressure by a simple pressure regulator. For a particular engine such a control requires a fuel injection of about 3 crank angles at 600 r.p.m. idle for a hot engine and 120 crank angles at 6,000 r.p.m. developing over 65 percent of 6,000 r.p.m. peak torque.

When the throttling orifice becomes a non-criticalflow orifice then the quantity of fuel injected per cycle must be trimmed back as a function of decreasing r.p.m. for a constant throttle setting. This is achieved by rotating pickup 172 toward pickup 156 using an r.p.m. sensor consisting of, for example, either centrifugal weights or an electronic integrator, that retard pickup 172.

The operation may better be illustrated by considering the operation of an engine at a particular throttle setting over the complete r.p.m. range. At 600 r.p.m. the engine develops essentially wide open throttle torque and may be limited by practicality to this part throttle torque. As the speed increases the centrifugal advance mechanism associated with pickup 172 advances until 3,000 r.p.m. is reached at which speed the throttle reaches critical flow and the torque is about 60% of wide open throttle torque at 3,000 r.p.m. Further increases in r.p.m. require no further advancement of pickup 172 and the injection duration from 3,000 to 6,000 r.p.m. is held constant at 64 crank angles. Other throttle settings produce the same control response with the throttle reaching critical flow at lower r.p.m.'s with reduced throttle settings. The critical flow is reached at a unique r.p.m. and throttle setting for other variables held constant. Specific engine designs having particular air-breathing and fuel-air mixture requirements require minor modifications to these control specifications. These modifications can be achieved by simple adjustments or trim controls since the gross control features are achieved by this design. Examples of trim controls are: fuel feed pressure depression at idle and low-speed low-load operation which increases the injection duration in crank angles; higher feed pressures at high r.p.m. in order to enrich the fuel-air mixture for higher power and torque outputs; and compensation for exhaust gas recirculation or excessive valve overlap.

Three auxiliary controls of conventional form are useful to give the engine acceptable performance under all conditions of operation. The first is a device for starting the hot engine. This consists of a mechanism for fully retarding pickup 172, which usually can be achieved by the centrifugal advance mechanism. Additional compensation can be achieved by reducing fuel feed pressure. The second auxiliary control is a cold start device which increases feed pressure to produce a finer atomization at low temperature. The feed pressure is adjusted by the pressure regulator. Additional fueling can be achieved by advancing pickup 172. The third auxiliary control device compensates for engine and air temperature and can include, for example, a thermistor that increases voltage applied to actuator 164 by increasing alternator field current in field coil 148 or a mechanical bellows that actuates the pressure regulator. One location for a temperature sensor that indicates the combined effect of both air and engine temperature is at the intake valve port.

High performance engines that have excellent breathing are effectively controlled by two throttles mounted on a common shaft. One provides from 2 to about 10% flow area and the boost throttle providing from about 10 to 100% flow area.

Additional compensation for variations in altitude or atmospheric pressure are readily incorporated into the present engine. A simple pressure sensor may be used which reduces the feed pressure for decreasing atmospheric pressure, or increasing feed pressure for turbocharging, by adjusting the pressure regulator.

The above control system may operate either port injected or cylinder injected spark ignition engines in which piezoelectrically actuated valves are used in the fuel injection system.

The control system for diesel (compression ignition) engines is considerably simplified, since the air and fuel flows need not be regulated as accurately as in spark ignition engines. The control of the actual injection process is critical, however, and requires the precise control of injection timing, during and rate of injection none of which are very critical to the spark ignition engine fuel injection system described above. As a result, the operation of the control system is different and may be illustrated by the following for a piezoelectrically actuated (common-rail) injection system using a pulse field alternator of the type indicated at 142 in FIG. 4 as the voltage generator.

Consider two engine operating conditions: one at variable indicated torque or variable indicated mean effective pressure (variable IMEP) and at constant r.p.m., and the other at variable r.p.m. at constant IMEP. Variable IMEP at constant r.p.m. is obtained with a fixed fuel feed pressure and variable injection pressure (pressure at nozzle orifice) and delivery duration. The injection pressure is varied by varying the voltage applied to electroexpansive actuator 164 which in turn varies the lift of the delivery valve and consequently the pressure drop across the delivery valve. The delivery duration is varied by varying the number of crank angles that the delivery valve is open, which is controlled by the angular location of pickup 172. This location is accomplished by rotating the housing of pickup 172 in a manner analagous to rotating the distributor in a conventional spark ignition engine to alter spark timing. In other words, the conventional rack rotates packup 172 with additional compensation obtained by varying the generator voltage.

Constant IMEP at variable r.p.m. is obtained primarily by controlling the fuel feed pressure to the injectors which in turn is obtained by controlling the pressure of the high pressure fuel pump.

These features of control can better be visualized by considering the following parameters, even though they are somewhat unrealistic.

TABLE

| Engine r.p.m. | 600 | 1,200 | 3,600 |
|---|---|---|---|
| IMEP (p.s.i.) | 25 | 25 | 25 |
| | 125 | 125 | 125 |
| | 500 | 500 | 500 |

The control of IMEP from 25–125 p.s.i. and at a constant speed in the speed range from 1200–3600 r.p.m. is obtained by a combination of valve lift and duration. For example, the feed pressure at 1200 r.p.m. could be 4000 p.s.i. and the injection pressure drop across the nozzle orifice could be approximately 3500 p.s.i. at 125 IMEP. The delivery duration at 125 IMEP could be 9 crank angles. As the IMEP is increased from 125 to 500 p.s.i. the duration would increase from 9 to 26 crank angles in order to reduce the rate of pressure rise. In addition, a pilot charge could be used. However, the injection pressure would not exceed 4000 p.s.i.

As the engine speed is increased it appears desirable to deliver the fuel quantity in the same number of crank angles. As a result of this fact, and that of using fixed area nozzle orifices, the fuel feed pressures would have to be increased by a factor of 9 such that the pressure drop across the nozzle orifices is 9 (3500) or slightly over 30,000 p.s.i. for IMEP outputs of 125–500 p.s.i. This increase in injection pressure also insures that the drop size of the injected fuel spray is reduced sufficiently to keep the physical delay period, measured in crank angles, approximately independent of engine speed. It may also be possible to maintain, over this engine r.p.m. range, the chemical delay period within the same number of crank angles by using pilot injection and adjusting air turbulence.

A method of reducing this high injection pressure requirement at high engine speeds is to use avariable area nozzle orifice such that the effective orifice area increases with injection pressure. One such nozzle design is the multiplex nozzle design described in the co-pending patent application filed concurrently herewith. As an example, if the orifice area would increase by a factor of two from 1200 to 3600 engine r.p.m. then the feed pressure increase required would be about 2.25 or from 4000 to 9000 p.s.i. This increase in pressure may not be sufficient to maintain the physical delay period to a fixed number of crank angles throughout this speed range as a result of an insufficient decrease in drop size. However, the use of a high-frequency voltage signal applied to the piezoelectric actuator may cause a sufficient pressure oscillation across the injector nozzle orifices to reduce the drop sizes sufficiently that the physical delay period may be held to a fixed number of crank angles.

Consider now the system's operation below 1200 r.p.m. As the engine speed decreases from 1200 to 600 r.p.m., the feed pressure remains constant at about 4000 p.s.i. but the time for injection doubles for a fixed number of crank angles. In order to provide for good fuel atomization, penetration, and dispersion the pressure drop across the nozzle orifice must be maintained, say, at about 3500 p.s.i. One method of accomplishing this is to utilize an apparent feature of this fuel injection system which is an oscillatory discharge at slower speeds. If the system design parameters are properly chosen then oscillatory discharge can begin at about 1200 r.p.m. and become more pronounced down to about 600 r.p.m. at which speed the effective delivery time is the same as at 1200 r.p.m. but has been spread out during a doubled time period, thereby maintaining the delivery duration over the same number of crank angles. On the other hand, the field current of the alternator can be pulsed harder and the second pickup 172 can be switched earlier to achieve fuel delivery in about one-half the crank angles required at 1200 r.p.m. Undoubtedly there exists a trade-off here, but only actual engine tests will establish this trade-off. Also it is doubtful that a 500 p.s.i. IMEP will be pulled at 600 r.p.m. in a high speed diesel.

Starting imposes an entirely new set of criteria. It would appear desirable to have a high injection pressure (at least 4000 p.s.i.), a certain amount of overfueling and possible pilot injection produced by a separate pair of timing pickups, such as variable reluctance pickups. Such separate pair of timing pickups are angularly phased in relation to time pickups 98 and 100 that time the primary injection. One method of accomplishing these features is to switch in an oscillator for the alternator field at cranking speeds. This produces a number of separate injections of short duration and high pressure over either the normal injection delivery period, measured in crank angles, or over a different number of crank angles.

Timing advance and retard can be varied by rotating pickups 156 and 172 together without changing injection duration. Timing advancement as speed increases is necessary for maintaining the peak combustion pressure at the same crank location as well as maintaining high efficiency.

No additional auxiliary control devices are usually required such as engine and air temperature compensation. However, an intake air pressure sensor located close to the inlet port may be desirable not only to compensate for variations in intake pressure, primarily caused by turbocharging but also to prevent overfueling and excess exhaust smoke during the turbocharger lag period which occurs when the throttle is suddenly opened.

The hereinabove described control systems can equally well be applied to control the injections and pumping of fluids by piezoelectric pumps of the type described in U.S. Patent 3,194,162 or in co-pending U.S. Patent application Ser. No. 484,404, filed Sept. 1, 1965.

In each of the embodiments described hereinabove, it will be noted that the duration and timing of fuel injection is proportional to the duration and timing of an electrical pulse or signal. Because many techniques exist for conveniently and accurately controlling electrical signals, the present invention is particularly suited for employment on motor vehicle engines wherein varying operating conditions are encountered. For example, electric sensors can be provided for determining engine r.p.m., engine intake manifold pressure, engine torque, and constitution of exhaust smoke or exhaust emissions. Through conventional electronic feedback circuitry, these parameters can be converted to electrical signals that can be used to control the duration and timing of fuel injection and/or spark ignition. The control made possible by the present invention is extremely convenient and straightforward because the time and duration of fuel injection is proportional to the time and duration of an electrical signal.

Referring now to FIGURE 5 an electroexpansive module 202 of a type similar to that shown in FIGURE 1A is operatively connected to be driven by a control system of the invention. The control system includes a voltage source 204 that has a negative terminal grounded at 206 for permanent connection to one of the terminals 208 of module 202. A plurality of capacitors 210A, 210B and 210C are connected in the circuit for alternate connection between a first state in parallel connection with battery 204 and module 202 and a second state in cascade or series combination with one another and with battery 204, such combination being in parallel with the electroexpansive module. For effecting such connections of the capacitors three switches are associated with each capacitor.

Associated with capacitor 210A is an upper charging switch 212A, a lower charging switch 214A and a reversing-discharge switch 216A. Control terminals of the respective switches are connected to a switching circuit 218A which in a first state closes switches 212A and 214A and opens switch 216A, and in a second state opens switches 212A and 214A and closes switch 216A. Associated in an identical manner with capacitor 210B is an upper charging switch 212B, a lower charging switch 214B and a reversing-discharge switch 216B. A trigger control circuit 218B is provided for controlling switches 212B, 214B and 216B. Associated with capacitor 210C are similar elements, namely: an upper charging switch 212C, a lower charging switch 214C, a reversing-discharge switch 216C and a trigger control circuit 218C.

The operation of the control system of FIGURE 5 can be more fully appreciated by reference to FIGURES 5A, 5B and 5C and is an follows: at the outset circuits 218A, 218B and 218C are in a first or quiescent state at which the switches 212 and 214 are all closed, and switches 216 are open. In such state capacitors 210A, 210B and 210C are connected in parallel with one another and with battery 204 and module 202. In this state, the module and each individual capacitor has a preliminary charge equal to the voltage of source 204, designated $e$ hereinafter. The mechanical output of module 202 is at a first position or condition when module 202 is so charged.

In order to charge module 202 to a voltage equal to $2e$, and thereby affect the mechanical output thereof, trigger circuit 218C is pulsed to open switches 212C and 214C and to close switch 216C so that the circuit is connected as shown in FIGURE 5A. Accordingly, battery 204 is in series with capacitor 210C, and a voltage equal to $2e$ is applied to module 202.

In order to expand module 202 even more, a voltage equal to $3e$ is applied to the module and for this purpose trigger circuit 218B is pulsed so as to open switches 212B and 214B and close switch 216B. As a consequence, the circuit is configured as shown in FIGURE 5B so that voltage source 204, capacitor 210B, and capacitor 210C are connected in series combination, the combination being connected across module 202. Finally, a voltage equal to $4e$ is applied across the module by pulsing trigger circuit 218A so as to open switches 212A and 214A and close switch 216A. The circuit is thus connected as shown in FIGURE 5 so that the battery and the three capacitors are connected in series combination, which combination is connected across module 202 and module 202 is subjected to the maximum voltage.

In FIGURE 5 the output lead of the control circuit is shown in broken line form at 220; such showing indicates that additional stages can be connected in circuit to apply a greater multiple of the voltage $e$ to module 202. Each stage includes a capacitor 210, switches 212, 214 and 216 connected in circuit as described above and a trigger control circuit 218. The control system of FIGURE 5 is capabale of producing a wide variety of output voltage profiles because the time between successive control pulses to control circuits 218 can be varied to suit conditions. Such outputs are digital in the sense that the mechanical output is pulsed or stepped each time one of the circuits 218 is switched.

Figure 6:
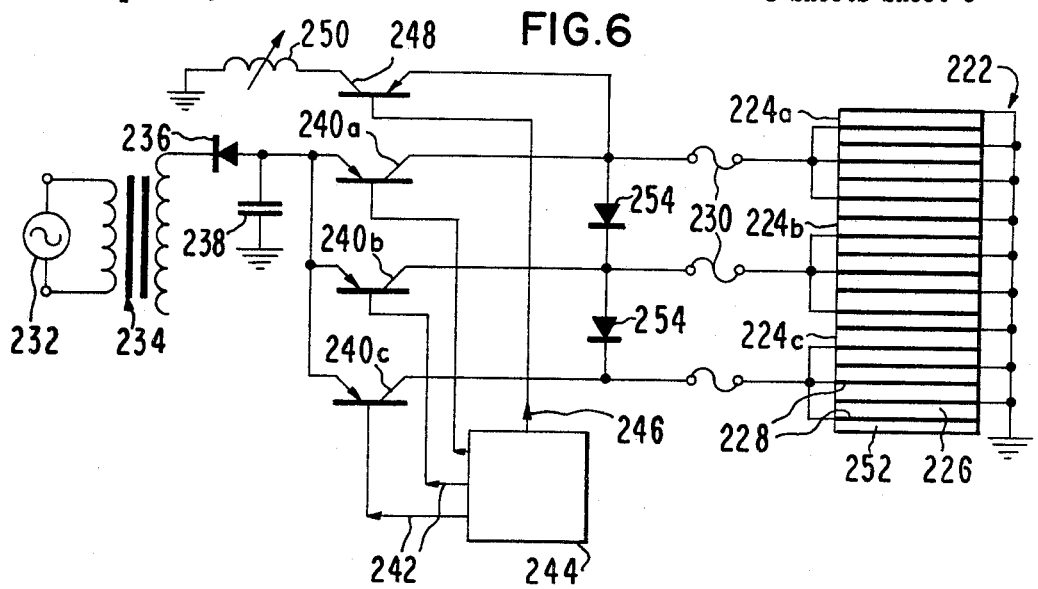
FIG. 6 is a schematic diagram of a control system for digitally actuating a transducer from an AC source.

Another control system for achieving a digitally stepped output is shown in FIGURE 6 in assocation with a module 222. The module includes a plurality of stages, three of which are indicated at 224a, 224b and 224c. In this context a stage includes a group of ceramic discs 226 and a plurality of interconnected electrodes 228. Each stage is individually connected to the control circuit through a fuse 230 to assure operation of the module even should one of the stages becomes short-circuited or otherwise inoperative.

The control system includes a constant frequency AC power source 232 which is connected to the primary of a variable ratio step-up transformer 234. The secondary of transformer 234 is connected to a rectifier 236, the output of which is connected to a capacitor 238. Switching elements are provided for connecting the capacitor 238 across the stages of module 222, a switch 240a being assocaited with stage 224a, a switch 240b being associated with stage 224b, and a switch 240c being associated with stage 224c. Each of the switches has a control lead 242, and each control lead is connected to a triggering unit 244. Triggering unit 244 is a more or less conventional control circiut that operates in a manner described hereinbelow. The control circuit has an output lead 246 which is connected to a discharge switch 248. Switch 248 establishes a path from each stage of the module to ground through a variable impedance 250.

The operation of the circiut of FIGURE 6 can be appreciated by assuming that module 222 is electrically discharged, that capacitor 238 is fully charged, and that trigger circuit 244 has established switches 240a, 240b and 240c at open conditions. Switch 248 is also established in an open position. Triggering unit 244 first turns on switch 240a so as to charge stage 224a of module 222 to a voltage equal to the voltage at which capacitor 238 is charged. Such charging of state 224a cause elongation of the module and consequent stepped axial movement of one end of the module, such end being indicated by an end plunger 252. During the next cycle of the alternating charging voltage from source 232, capacitor 238 is recharged. Trigger circuit 244 is next caused to close switch 240b so as to charge stage 224b of the module. Such action causes expansion of the ceramic discs constituting stage 224b, which elongation is added to that caused by actuation of stage 224a to effect further movement of plunger 252. In a manner identical to that described above, switch 240c is caused to connect a voltage from capacitor 238 across stage 224c of module 222. As a result of this, module 222 is additionally elongated.

In order to discharge the module and restore it to its original position, a control pulse is applied through lead 246 to switch 248 to establish a path to ground through variable impedance 250. The path includes diodes 254 which diodes prevent interference between the various stages during charging of the stages and permit simultaneous discharge of all stages of the module. The discharge rate and time is controllable by suitable variation of the impedance 250.

Figure 6A:
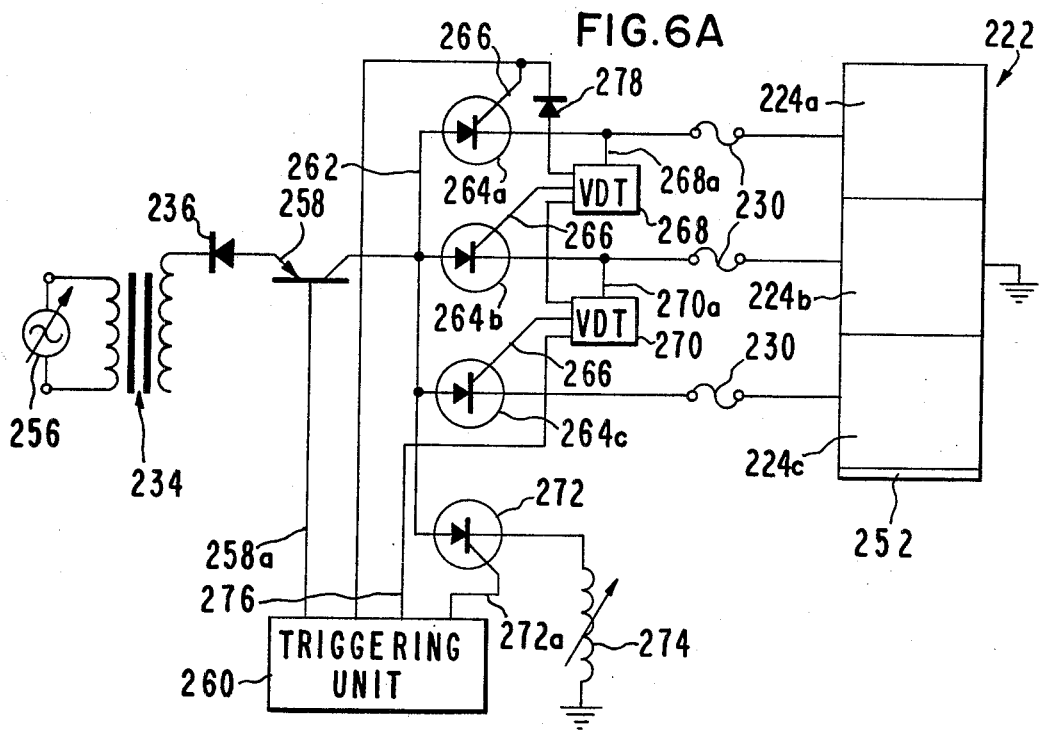
FIG. 6A is a schematic diagram of a control system that functions similar to the system of FIG. 6 and includes certain modifications.

FIGURE 6a is in many respects similar to FIGURE 6; to the extent that the circuit is similar, identical reference characters are employed in FIGURE 6a. A variable frequency AC power source 256 is connected to the primary of variable ratio step-up transformer 234. The output of the transformer is rectified by a diode 236. The rectified output of diode 236 is connected to the input of a start switch 258. Start switch 258 has a control lead 258a that is connected to a triggering unit 260, the function of which will be described in more detail hereinafter. Suffice it to say that triggering unit 260 contains conventional control and timing circuitry; the specific characteristics of the triggering unit are not part of the present invention. The output of start switch 258 is connected to a common lead 262 which connects to the input terminals of a plurality of trigger switches such as silicon control rectifiers (SCR's) 264a, 264b and 264c. The outputs of these silicon control rectifiers are connected through fuses 230 to the respective stages in module 222. Each switch 264 has a control lead 266, the control lead of switch 264a being connected to trigger unit 260. The control lead 266 of switch 264b is connected to a variable time delay trigger 268. Variable time delay trigger 268 has an input lead 268a that is connected to the output of switch 264a; the variable time delay trigger operates so that switch 264b is turned on after switch 264a is turned on, the time between the two events being controllable so that the appropriate digital output of module 222 can be achieved. A second variable time delay trigger 270 has an input lead 270a connected to the output of switch 264b and acts to trigger switch 264c by applying to control terminal 266 of the latter switch a pulse that is delayed from the time that switch 264b is turned on. Application of such pulse to switch 264c turns that switch on thereby to energize module 222. A discharge switch 272 is provided for connecting the inputs of all switches 264 to ground through a variable impedance 274. Discharge switch 272 has a control lead 272a that is connected to trigger unit 260 so as to permit appropriate time control of discharge.

The operation of the embodiment of FIGURE 6a is as follows: AC power source 256 is set at a frequency that corresponds to the digital frequency at which it is desired to energize module 222. Trigger unit 260 is cycled to open switch 258 and a positive going AC signal is applied to the inputs of all switches 264. The triggering unit is cycled to transmit a turn-on pulse to control lead 266 of switch 264a so that the switch is turned on. Accordingly, the positive going signal is connected through switch 264a to stage 224a of module 222. The consequence of such is that stage 224a is elongated and plunger 252 is correspondingly elongated. Simultaneous with the energization of stage 224a, the input of variable time delay 268 is triggered. After a time interval equal to the delay time for which delay trigger circuit 268 is adjusted elapses, control lead 266 of switch 264b is pulsed so as to turn on switch 264b. Accordingly, stage 224b is charged and the module is further elongated. At the same time that stage 224b is pulsed, variable time delay trigger 270 is pulsed, as a consequence of which switch 264c is turned on at some subsequent time. When the latter switch is turned on, stage 224c is charged and the module is further elongated. Obviously, additional switches 264 and additional stages 224 can be added to the system.

When the module 222 is totally elongated it can be discharged by application of an appropriate signal switch 272; such action connects the input of all the SCR's to ground through variable inductance 274 and thus disables the further input of power to the module. The variable time delay triggers 268 and 270 are reset by a reset lead 276 which includes a diode 278 for preventing interference between initial triggering of the circuit and restoration of the variable delay trigger circuits. The control system of FIGURE 6a provides a large range of operating flexibility of actuator 222 and more particularly affords generation of virtually any stroke-time profile. Such versatility is achieved because of the provisions for varying trigger frequency and varying time delay for each stage. Also contributing to the versatility of the circuit is the fact that the magnitude of the actuator sroke is controlled by the voltage supplied by the variable ratio step-up transformer and the rate is prescribed by the variable frequency of the triggering unit and of the shorting switch 272.

Another form of the control system of the present invention is shown in FIGURE 7. The system of FIGURE 7 includes an AC power source 280 that is coupled to the primary of a transformer 282. The low voltage source is also rectified by a rectifier 284 and then fed through a switch such as a transistor 286 to an electromagnetic actuator 288. The high voltage secondary of transformer 282 is rectified by rectifier 290 and then connected to a capacitor 292. A high voltage switch such as the transistor 294 is provided between capacitor 292 and actuator 288 so that the capacitor can be controllably discharged into the electromagnetically driven actuator. A triggering unit 296 is provided for controlling the system and operates as follows:

With both switches 286 and 294 open, capacitor 292 will be charged to a relatively high voltage from the voltage stepped up by transformer 282 and rectified by rectifier 290. When it is desired to actuate actuator 288, triggering unit 296 is cycled to close switch 294 and establish a discharge from capacitor 292 through the actuator. A high initial current is thereby supplied to the actuator. The current subsequently decays. Before the decay is substantial, triggering unit 296 cycles to close switch 286 so as to connect to actuator 288 a constant current sufficient to maintain the position of the actuator. If it is desired to further stress the actuator, capacitor 292 can again be discharged into the actuator, after having previously been recharged. Thus, it will be seen that the system of FIGURE 7 provides a large initial force to be generated by the actuator but at the same time limits the total energy necessary to be supplied to the actuator. Such mode of operation avoids overheating of the actuator and other circuit elements as well as conserving power consumed by the device.

The control system of FIGURE 8, similar in some respects to the system of FIGURE 4, includes an alternator 302 that has a rotor 304 supported for rotation on a shaft 306. Carried on the rotor are diametrically spaced poles or conductor bars 308 and 310. The alternator includes a housing 312 in which rotor 304 is supported for rotation; the housing has a plurality of poles radiating inwardly toward the rotor. In the specific example of the invention shown in FIGURE 8, there are a first pole 314, a second pole 316, and a third pole 318.

Associated with pole 314 is a winding 320 that is supplied with D.C. biasing current from a suitable power source 322. Associated with pole 316 is an auxiliary winding 324 and associated with pole 318 is an output winding 326. In one structure designed according to this invention, each of the rotor conductor bars 308 and 310 has a circumferential extent of approximately 90°, pole 316 is spaced from pole 314 by approximately 80° and pole 318 is spaced from pole 316 by approximately 120°.

For controlling the functions of the system of FIGURE 8, a control circuit 328 is provided. The functions of control circuit 328 include supplying winding 324 with a pulse of current at appropriate times and controlling a discharge switch 330, the function of which will be fully explained hereinafter.

An electroexpansive module 332 of the type referred to previously is connected to output winding 326 through a silicon controlled rectifier (SCR) 334. The SCR has a gate terminal 336 that is connected to a voltage divider 338. Such circuit arrangement permits attainment of a substantial voltage level at the input, or anode, side of SCR 334 before the SCR is triggered to a conductive state, as a consequence of which a fast rising surge or pulse is applied to module 332. Accordingly, module 332 is driven to a charged state at a fast rate. To activate discharge switch 330, a control lead 340 extends from control circuit 328 to the discharge switch. The discharge switch is connected to winding 320 through a device for affording only unilateral current flow, such as a diode 342.

The operation of the embodiment of FIGURE 8 is as follows: if it is assumed that shaft 306 is driven at a rotative speed proportional to the desired frequency of excitation of module 332, such as would occur in the environment that includes an internal combustion engine having a crank shaft and a pulley for coupling power from the crank shaft to rotor shaft 306, it can be seen that in the position of rotor 304 and conductor bars 308 and 310 shown in FIGURE 8, magnetic flux lines will just begin to cut the turns of winding 326. Consequently, a voltage will begin to build up in the winding. As rotation continues the voltage will ultimately reach a magnitude sufficient to trigger SCR 334, thereby activating module 332. The voltage applied to the module continues to increase as the rotor continues to rotate and after traversing approximately 80°, conductor bar 308 moves out of flux communication with pole 314 and winding 320. Consequently, the magnetic field in the rotor collapses and the voltage in output winding 326 correspondingly collapses. When the field collapses, module 332 remains charged because SCR 334 resists current flow in a reverse direction and discharge switch 330 is at an open conditon. Control circuit 328 can be timed to close discharge switch 330 at any time that it is desired to dicharge the module.

For discharging the module an appropriate trigger signal is applied to control lead 340 by control circuit 328 so that closure of discharge switch 330 is effected. Closure of switch 330 establishes a current path from the module to winding 320. Accordingly, the energy in module 332 is conserved, in that a substantial portion of it is temporarily stored in coil 320 until a rotor bar, for example rotor bar 310, again reaches a position of proximity to pole 314. The presence of diode prevents interference between the bias supply to winding 320 and the discharge circuit.

In an alternate mode of operation auxiliary winding 324 is biased with a current so polarized that the direction of the flux field adjacent pole 316 is opposite that adjacent pole 314. Thus, the field produced by winding 324 partially or fully cancels the field produced by winding 320. As rotor bar 308 cuts the flux lines generated by winding 324, which are oppositely directed, the flux in the output winding reverses and drops to a negative value. Consequently, the present of auxiliary pole 316 and its associated winding 324 permits doubling of the output at winding 326. Moreover, by adjusting the time at which winding 324 is excited from control circuit 328, such time being in reference to the rotative position of the conductive bars relative pole 316, the time duration of the output pulse from output winding 326 is variable. Consequently, a highly controllable and versatile system is provided by the present invention and specifically by the embodiment shown in FIGURE 8.

Thus, it will be seen that the present invention provides a control system employing electroexpansive active elements which control system is extremely accurate and versatile. Although the systems are particularly suited for controlling fuel injection in internal combustion engines and electromechanical servos and actuators, those skilled in the art will readily appreciate other applications for the control system of the present invention.

Although several embodiments of the invention have been shown and described, it will be apparent that other adaptations and modifications can be made without departing from the true spirit and scope of the invention.

What is claimed is:

1. A control system for a pump actuator of the type having an active electroexpansive element that is operable between a stressed condition and a relaxed condition, said system comprising:
   a voltage source,
   first normally inoperative switch means coupling said voltage source to the element when said first switch means is rendered operative to charge said element to cause said element to assume a stressed condition,
   a discharge path,
   second normally inoperative switch means coupling said element to said discharge path when said second switch means is rendered operative to discharge said element causing it to assume a relaxed condition,
   means for sequentially actuating said first and second normally inoperative switch means in timed relation,
   first variable means connected between said voltage source and said element for controlling the magnitude and rate of increase of charge applied to said element, and
   second variable means connected in the discharge path of said element for controlling the rate of discharge of said element, whereby the stress time duration and amplitude of charge of said element may be controlled.

2. A control system as recited in claim 1 wherein said means for sequentially actuating said first and second normally inoperative switch means comprises a shaft supported for rotation, a first and second pickup means respectively positioned at spaced locations adjacent said shaft, a first and a second means for generating a signal in said respective first and second pickup means when adjacent thereto said first and second means being mounted on said shaft and to be rotatable therewith and being angularly displaced from one another to provide a preselected time interval between signal generation in said first and second pickup means, means for applying the signal in said first pickup means to said first normally inoperative switch means to render it operative, and means for applying the signal in said second pickup means to said second normally inoperative switch means to render it operative.

3. A control system as recited in claim 2 wherein said first pickup means position is adjustable relative to said second pickup means to afford adjustment of the time interval between actuation of said respective first and second normally inoperative switch means.

4. A control system as recited in claim 1 wherein each said first and second variable means comprises a variable impedance.

5. A control system according to claim 1 wherein said voltage source comprises an alternator having a stator and a field coil spaced apart and cooperatively associated to define a flux path therebetween, and rotor means mounted for movement between said stator and field coil to cut the flux path and generate a voltage, and wherein said discharge path includes said field coil.

6. A control system as recited in claim 1 wherein said active electroexpansive element comprises a plurality of active electroexpansive elements mounted mechanically in series.

7. A control system according to claim 6 wherein said first normally inoperative switch means includes means responsive to an electric pulse for independently connecting said voltage source to each of said elements, and said second normally inoperative switch means includes means responsive to an electric pulse for independently discharging each of said elements, and said means for sequentially actuating said first and second normally inoperative switch means in timed relation includes means for generating electric pulses having variable magnitude and variable rate of increase from a lower state to such magnitude for application to said respective first and second normally inoperative switch means to control the rate and magnitude of actuation and deactuation of each of said first and second normally inoperative switching means.

8. A control system according to claim 1 wherein said electrical pulse generating means comprises a switching element, means for producing a cyclic voltage for triggering said element, a variable time delay having an input connected to said switching element, said variable time delay device having an output connected to an element of said electroexpansive module, so that a variable actuation time profile of the electroexpansive elements may be generated.

9. A control system according to claim 7 wherein said electrical pulse generating means comprises an AC voltage source and means for varying the frequency and magnitude of said AC voltage source so that the actuation time and deactuation time of the electroexpansive elements is variable by varying the frequency of the voltage source and the extent of actuation is varied by varying the magnitude of the voltage source.

10. A control system according to claim 7 wherein said electrical pulse generating means comprises a switching element, a variable delay triggering means connected to said switching means so as to provide a variable actuation time profile of the electroexpansive elements.

References Cited

UNITED STATES PATENTS

| | | | |
|---|---|---|---|
| 2,918,911 | 12/1959 | Guiot | 123—32 |
| 3,020,897 | 2/1962 | Sekine et al. | 123—32 |
| 3,051,152 | 8/1962 | Paule et al. | 123—119 |
| 3,150,592 | 9/1964 | Stec | 103—1 |
| 3,194,162 | 7/1965 | Williams | 103—1 |
| 2,829,631 | 4/1958 | Wilt | 123—139 |

LAURENCE M. GOODRIDGE, Primary Examiner

U.S. Cl. X.R.

103—1